US008312272B1

(12) United States Patent
Serenyi et al.

(10) Patent No.: US 8,312,272 B1
(45) Date of Patent: Nov. 13, 2012

(54) SECURE AUTHENTICATION TOKEN MANAGEMENT

(75) Inventors: Denis Serenyi, Arlington, VA (US); Zulfikar Ramzan, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 685 days.

(21) Appl. No.: 12/492,962

(22) Filed: Jun. 26, 2009

(51) Int. Cl.
*H04L 29/32* (2006.01)
*G06F 11/30* (2006.01)

(52) U.S. Cl. .................... 713/168; 713/192; 713/193
(58) Field of Classification Search .......... 713/164–167, 713/188, 189, 192–194; 726/1–2, 16–21, 726/26–30; 380/277–286; 719/1
See application file for complete search history.

(56) References Cited

U.S. PATENT DOCUMENTS

| | | | | |
|---|---|---|---|---|
| 6,233,685 | B1* | 5/2001 | Smith et al. ................... | 713/194 |
| 2003/0188165 | A1* | 10/2003 | Sutton et al. ................... | 713/176 |
| 2004/0193888 | A1* | 9/2004 | Wiseman et al. ............... | 713/176 |
| 2005/0021968 | A1* | 1/2005 | Zimmer et al. ................ | 713/176 |
| 2005/0138370 | A1* | 6/2005 | Goud et al. .................... | 713/164 |
| 2005/0138384 | A1* | 6/2005 | Brickell et al. ................. | 713/182 |
| 2005/0251857 | A1* | 11/2005 | Schunter et al. ................ | 726/16 |
| 2005/0283601 | A1* | 12/2005 | Tahan ............................... | 713/2 |
| 2006/0020781 | A1* | 1/2006 | Scarlata et al. ............... | 713/100 |
| 2006/0155988 | A1* | 7/2006 | Hunter et al. ................... | 713/164 |
| 2007/0016801 | A1* | 1/2007 | Bade et al. ..................... | 713/193 |
| 2007/0113096 | A1* | 5/2007 | Zhu et al. ....................... | 713/180 |
| 2008/0022128 | A1* | 1/2008 | Proudler et al. ............... | 713/189 |
| 2008/0083039 | A1* | 4/2008 | Choi et al. ....................... | 726/27 |
| 2008/0244569 | A1* | 10/2008 | Challener et al. ................ | 718/1 |
| 2009/0083539 | A1* | 3/2009 | Catherman et al. ........... | 713/156 |
| 2009/0089582 | A1* | 4/2009 | Brutch et al. .................. | 713/171 |
| 2009/0292919 | A1* | 11/2009 | England ........................ | 713/168 |
| 2010/0082991 | A1* | 4/2010 | Baldwin et al. ............... | 713/176 |

OTHER PUBLICATIONS

"TCG Specification Architecture Overview Specification," Aug. 2, 2007, Revision 1.4.*
Jonathan M. McCure et al., Flicker: An Execution Infrastructure for TCB Minimization, The European Conference on Computer Systems (EuroSys), Apr. 2008, 14 pages.

* cited by examiner

*Primary Examiner* — Darren B Schwartz
(74) *Attorney, Agent, or Firm* — Brill Law Office; Jeffrey Brill

(57) ABSTRACT

An authentication token management system securely manages an authentication token. Hardware based security extensions on a client are used to dynamically instantiate two dynamic secure virtual machines, a registration initiation module (RIM) and a registration completion module (RCM). A public key and a corresponding private key are generated, and the RIM seals the private key to the RCM. A request for an authentication token is signed by the hardware based security extensions and transmitted to the server. This request comprises at least the public key. In response, an authentication token encrypted with the public key is received. The RCM unseals the private key, and uses it to decrypt the received authentication token. The RCM then seals the authentication token to at least one additional dynamic secure virtual machine, which can use it to perform additional functionalities, such as data signing, encryption, generation and/or verification.

16 Claims, 6 Drawing Sheets

SECURE AUTHENTICATION TOKEN MANAGEMENT

TECHNICAL FIELD

This disclosure pertains generally to computer security, and more specifically to securely managing authentication tokens.

BACKGROUND

Many client-server systems use authentication tokens to uniquely identify clients to the server. Such tokens are provided by the server, and are stored on the clients, e.g., in system memory or on disk. An authentication token can be leased to a client for a period of time, or used by the client indefinitely. Examples of formats in which authentication tokens can be implemented are browser cookies and key stores.

Providing services through a cloud-based computing environment is becoming more prevalent today. In cloud computing, dynamically scalable resources are provided to users (e.g., clients) as a service over a cloud, which is typically the Internet or another large network. Cloud computing provides infrastructure and functionality as a service, mapping resources to individual users based on their real-time computing needs. Cloud computing services are typically provided to multiple users from one or more servers, accessed from a web browser or other interface, while the application(s) and corresponding data are stored on the servers. Users need not have knowledge of the underlying technology infrastructure "in the cloud" that supports them.

Like other computer networks, cloud computing environments are vulnerable to malicious users. Malicious users can query a cloud-based system excessively, trying to glean proprietary and/or confidential back-end data. Malicious users can also submit improper data to a cloud-based system, attempting to corrupt the back-end data store. To alleviate such concerns, a cryptographically secure, verifiable authentication token can be used. Such a token is generated by a server "in the cloud," and distributed to clients.

When used by either client-server systems or cloud computing environments, authentication tokens are subject to theft, both when in transit, and while at rest on clients. If malicious software were to inspect or copy an authentication token, the malicious software could fraudulently simulate the authorized client, and engage in the very types of unauthorized back-end access the token is designed to prevent. It would be desirable to address these issues.

SUMMARY

An authentication token management system on a client requests, receives and securely manages an authentication token. The authentication token management system uses hardware based security extensions on the client computer to dynamically instantiate two dynamic secure virtual machines, a registration initiation module (RIM) and a registration completion module (RCM). The hardware based security extensions used in this context can comprise, for example, a security extended CPU and a security coprocessor. The authentication token management system generates a public key and a corresponding private key. The RIM then uses the hardware-based security extensions to seal the private key to the RCM. The authentication token management system creates a request for an authentication token, which comprises at least the public key, and can further comprise at least one value from a register of the security coprocessor. In some embodiments, the authentication token management system also requests a nonce from the server, and adds the nonce to the request as well.

The RIM then uses the hardware based security extensions to sign the request for an authentication token. The authentication token management system transmits the signed request to the server, and in response receives from the server an authentication token encrypted with the public key. The RCM uses the hardware based security extensions to unseal the private key, and uses the unsealed private key to decrypt the received encrypted authentication token. The RCM then uses the hardware based security extensions to seal the authentication token to at least one additional dynamic secure virtual machine. More specifically, the RCM uses the hardware based security extensions to dynamically instantiate at least one additional dynamic secure virtual machine, and seal the authentication token thereto. This additional dynamic secure virtual machine can subsequently unseal the authentication token, and uses the unsealed authentication token to perform additional functionalities, such as signing, encrypting, generating or verifying data to be transmitted to the server.

On the server side, the server receives a signed request for an authentication token from the client. In some embodiments the server also receives a request for a nonce from the client. In such cases, the server transmits a nonce to the client. The signed request received by the server comprises at least the public key, and can also comprise the nonce and/or at least, one value from register of a security coprocessor on the client. In some embodiments the server receives a request for a nonce from the client. In such cases, the server transmits a nonce to the client. The server verifies that the signed request for the authentication token originates from an authorized client, based on the request being signed by authentic hardware-based security extensions on the client. Where the signed request also comprises the nonce and/or at least one value from a register of a security coprocessor on the client, these features are also used to verify that the signed request originates from an authorized client. The server then generates an authentication token for the client, and uses the received public key to encrypt the generated authentication token. The server then transmits the encrypted authentication token to the client.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
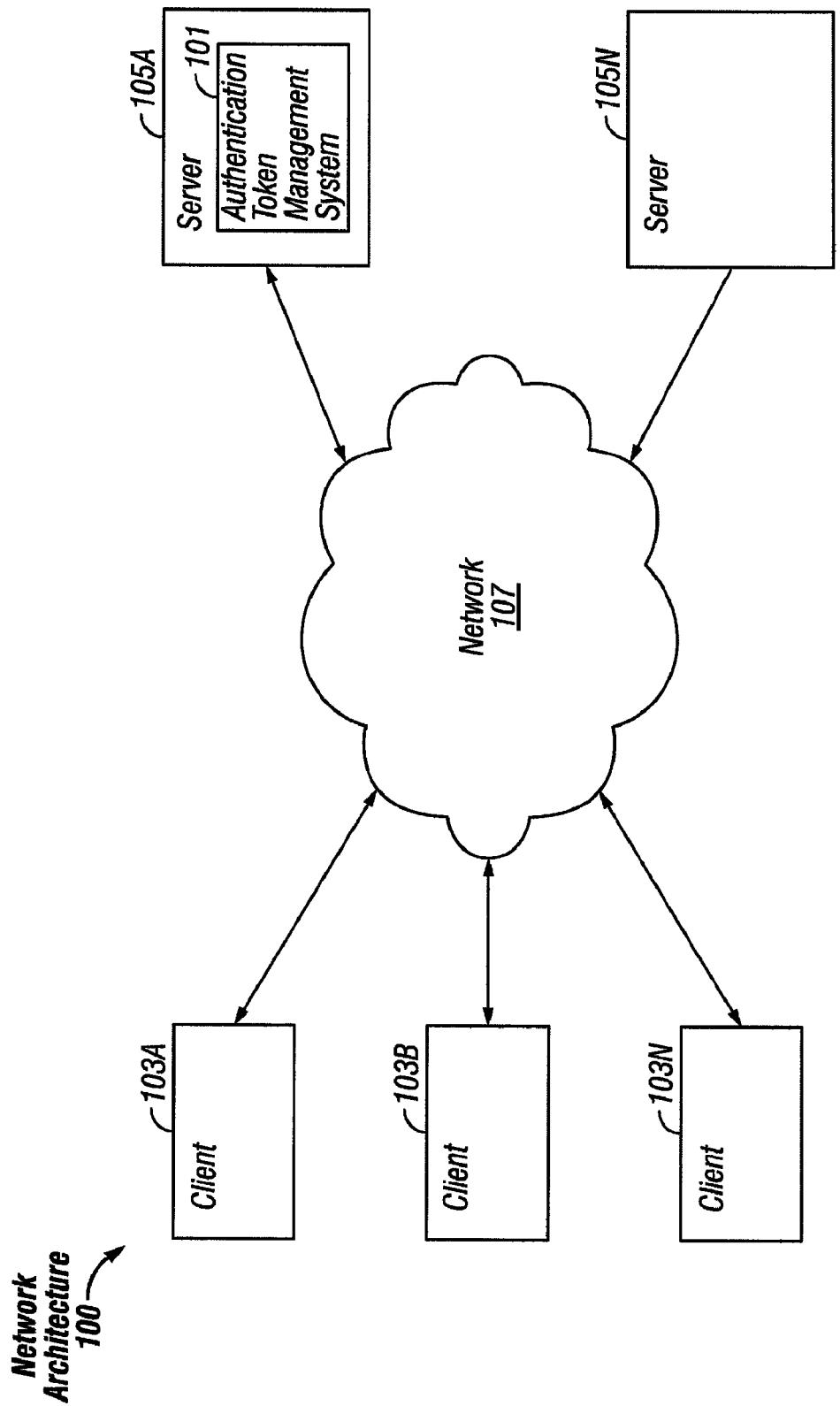
FIG. 1 is a block diagram of an exemplary network architecture in which an authentication token management system can be implemented, according to some embodiments.

FIG. 1 is a block diagram illustrating an exemplary network architecture 100 in which an authentication token management system 101 can be implemented. The illustrated network architecture 100 comprises multiple clients 103A, 103B and 103N, as well as multiple servers 105A and 105N. In FIG. 1, the authentication token management system 101 is illustrated as being distributed between client 103A and server 105A. It is to be understood that this is an example only, and in various embodiments various functionalities of this system 101 can be instantiated on a client 103, a server 105 or otherwise distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
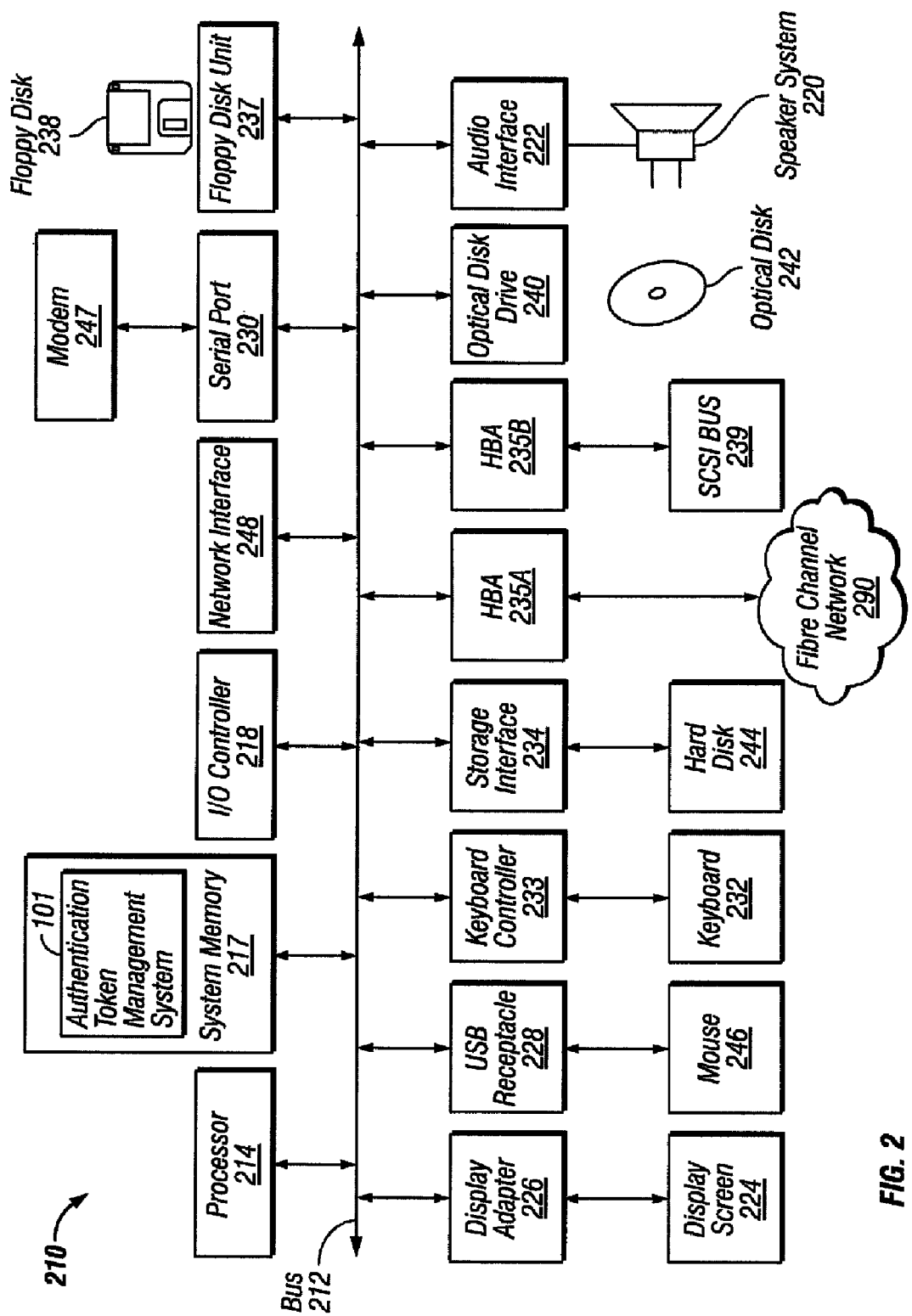
FIG. 2 is a block diagram of a computer system suitable for implementing an authentication token management system, according to some embodiments.

FIG. 2 is a block diagram of a computer system 210 suitable for implementing an authentication token management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the authentication token management system 101 is illustrated as residing in system memory 217. The workings of the authentication token management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
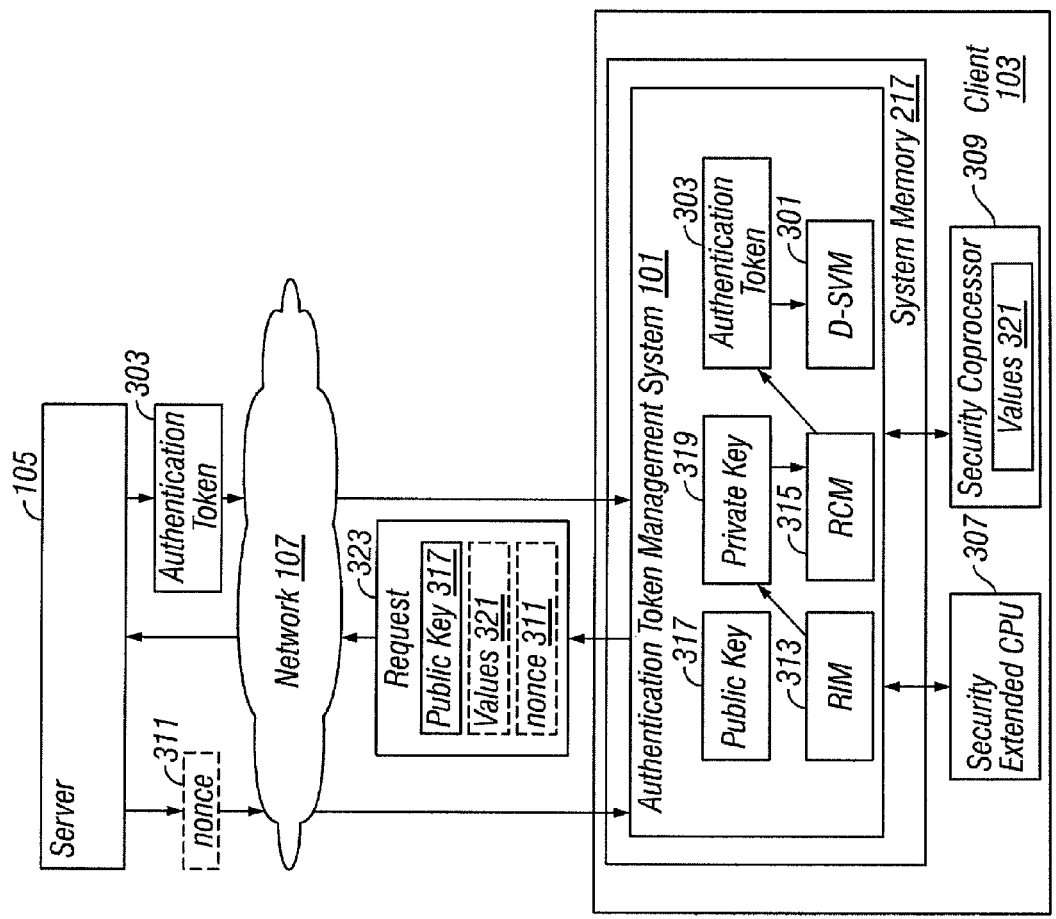
FIG. 3 is a block diagram of an authentication token management system requesting, receiving and securely managing an authentication token, according to some embodiments.

FIG. 3 illustrates an authentication token management system 101, residing in the system memory 217 of a computer system 210 according to some embodiments. This authentication token management system 101 is illustrated as residing on a client 103 and communicating with a server 105, but as described above more, fewer or different functionalities of the authentication token management system 101 can reside on a client 103, a server 105, or be otherwise distributed between multiple computer systems 210, including within a cloud-based computing environment in which the functionality of the authentication token management system 101 is provided as a service over a network 107. It is to be understood that although modules of the authentication token management system 101 are illustrated in FIG. 3 as separate entities, the illustrated authentication token management system 101 represents a collection of functionalities, which can be instantiated as fewer, more or overlapping modules as desired. It is to be understood that the modules of the authentication token management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the authentication token management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a dynamic instantiation module 302 of the authentication token management system 101 instantiates dynamic, secure virtual machines (D-SVMs) 301. A D-SVM 301, as the term is used herein, refers to a dynamically instantiated execution environment that utilizes hardware-based security extensions on a computer system 210 to maintain complete insulation from all other software on the computer system 210. In some examples, a D-SVM 301 may prevent direct memory access to its execution environment, disable interrupts, and otherwise insulate its execution environment from external access. Examples of hardware-based security extensions that may be leveraged in a D-SVM 301 context include, without limitation, processor-based security extensions, such as INTEL's TRUSTED EXECUTION TECHNOLOGY, security-coprocessor-based security extensions, such as Trusted Platform Module (TPM) or other security coprocessors that conform to standards promulgated by the TRUSTED COMPUTING GROUP and the like, chipset-based security extensions, user-input-based security extensions, display-interface-based security extensions, etc.

As used herein, the language "dynamically instantiating a D-SVM 301" refers to invoking a D-SVM 301 without requiring or executing a trusted boot process. When invoking a conventional virtual machine managed via a hypervisor, it is necessary to reboot into the hypervisor via a trusted boot process that leverages hardware-based security extensions. On the other hand, the instantiation module 302 can, by leveraging the above-described types of hardware-based security extensions on the client 103, dynamically instantiate a D-SVM 301 on the client 103 without having to reboot at all. Thus, a D-SVM 301 can be instantiated and executed on the client 103 without modifying the client's standard boot process. A D-SVM 301 can be securely instantiated and executed on the client 103 at any time, even where the client's operating system itself is insecure and/or untrusted.

The dynamic instantiation module 302 can dynamically instantiate D-SVMs 301 in a variety of ways. For example, the dynamic instantiation module 302 can instruct hardware-based security extensions (which may, as illustrated in FIG. 3, comprise a security extended CPU 307 and/or a security coprocessor 309) on the client 103 to dynamically instantiate a D-SVM 301. This can be done, for example, by executing hardware specific instructions on the hardware-based security extensions. For example, certain current Intel architectures provide an instruction of this nature called "SENTER," whereas certain current AMD based architectures provide such an instruction called "SKINIT." These specific instructions are just examples of implementation details used in some specific embodiments. In response, the hardware-based security extensions 307, 309 dynamically instantiate a D-SVM 301 by creating an execution environment on the client 103 that is securely and completely insulated from all other processes.

Still referring to FIG. 3, the authentication token management system 101 obtains an authentication token 303 from a server 105 for use by a client 103. The client 103 can subsequently use the authentication token 303 to engage in authenticated access to the server 105. This process of obtaining an authentication token 303 can be thought of as registering the client 103 with the server 105. In one embodiment the dynamic instantiation module 302 dynamically instantiates two D-SVMs 301: first a registration initiation module (RIM 313) and later a registration completion module (RCM 315), as described in greater detail below. These two D-SVMs 301 represent specific functionalities, which can be instantiated as more or fewer D-SVMs in other embodiments. In one embodiment, after the dynamic instantiation module 302 dynamically instantiates the RIM 313, and the RIM 313 generates a public key 317 and a corresponding private key 319. The RIM 313 then directs the security coprocessor 309 to seal the private key 319 to the RCM 315.

"Sealing" is a feature provided by security coprocessors 309 such as TPM. According to this feature as used herein, a sealing process (e.g., the RIM 313) directs the security coprocessor 309 to encrypt specific data (e.g., the private key 319) to a given process (e.g., the RCM 315). The security coprocessor 309 only allows the process to which the data is sealed to access it. More specifically, the sealing process (the RIM 313) calls the security coprocessor 309, and passes it the data to seal (the private key 319) and the address of the process (the RCM 315) to which the data is to be sealed. The security coprocessor 309 executes the block of code at that address (the RCM 315) such that no other process can access its execution environment. The security coprocessor 309 only allows access to the sealed data (the private key 319) to the process (the RCM 315) to which it is sealed. More specifically, in the example of TPM, the security coprocessor 309 sets specific ones of its platform configuration registers (PCR) to the hash value of the process (the RCM 315) to which the data (the private key 319) is sealed, to indicate that only that executing process can access the sealed data. (The term "PCR," as used herein, generally refers to a configuration register of a security coprocessor 309.) By sealing the private key 319 in this manner, the security coprocessor 309 ensures at a hardware level that only the RCM 315 can unseal and access the sealed private key 319.

The RIM 313 then creates a secure request 323 for an authentication token 303 to the server 105. To do so, the RIM 313 uses the public key 317 as part of the request 323. In some embodiments, for extra security, the RIM 313 also includes values 321 stored in the PCRs of the security coprocessor 309 as part of the request 323. For an additional level of security, the RIM 313 can also request a number to be used once (nonce 311) from the server 105, and include the nonce 311 with the request 323 as well. A nonce 311 is typically a random or pseudo-random number. Using a nonce 311 as part of the request 323 protects against the transmission of the request 323 being monitored by malicious code and reused in a replay attack. In any case, the RIM 313 directs the security coprocessor 309 to sign the request 323, which as discussed below indicates to the server 105 that the request 323 was generated by an authentic D-SVM 301. The RIM 313 then transmits the signed request 323 for an authentication token 303 to the server 105.

The server 105 receives the request 323 (which includes the public key 317), and verifies that it was generated by an authorized client 103. The server 105 can verify that an authorized client 103 generated the received request 323, because only a running D-SVM 301 would be able to successfully direct the security coprocessor 309 to sign the request with the PCR values 321. Responsive to the verified request 323, the server 105 generates a new authentication token 303 for the client 103, and encrypts the authentication token 303 with the provided public key 317. The server 105 sends the encrypted authentication token 303 to the authentication token management system 101.

The authentication token management system 101 invokes the RCM 315, passing it the encrypted authentication token 303 received from the server 105. The RCM 315 directs the security coprocessor 309 to unseal the private key 319, which only the RCM 315 can do, because the private key 319 is sealed to the RCM 315, as described above. The RCM 315 uses the private key 319 to decrypt the authentication token 303, and directs the security coprocessor 309 to seal the authentication token 303 to one or more approved D-SVMs 301 which are to be allowed to access the authentication token 303. Thus, only the approved D-SVM(s) 301 to which the authentication token 303 is sealed can access it, thereby protecting the authentication token 303 against theft or misuse.

Figure 4:
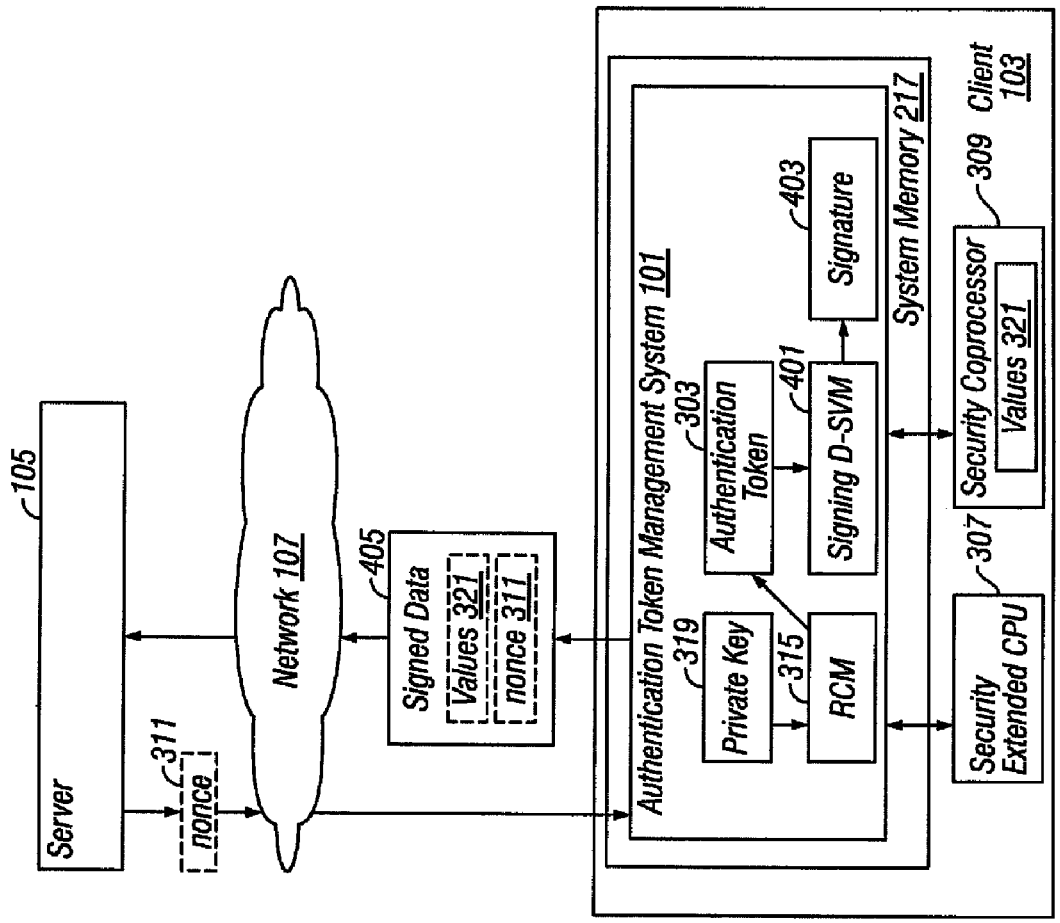
FIG. 4 is a block diagram of an authentication token management system securely managing an authentication token, according to some embodiments.

Once sealed on the client 103, the authentication token 303 can be unsealed and accessed only by the D-SVM(s) 301 that the RCM 315 specified. It is a variable design parameter how specifically the secure authentication token 303 is to be used, and thus to which D-SVM(s) 301 to seal it. For example, as illustrated in FIG. 4, in one embodiment the RCM 315 seals the authentication token 303 to a signing D-SVM 401, which can subsequently use the authentication token 303 to generate a signature 403 with which to sign data 405 to transmit to the server 105. The signing D-SVM 401 can use the authentication token 303 to generate the signature 403 by, for example, by using a secure hash function such as SHA. To prevent replays, the signing D-SVM 401 can also obtain a nonce 311 from the server 105, or attach a timestamp that can be verified by the server 105 to the signed data 405. The server 105 can verify that the received, signed data 405 was generated by the client 103 authorized to use the authentication token 303, because only an authorized D-SVM 301 on the client 103 can unseal the authentication token 303, and thus use it to sign the data 405. For additional security, as in the registration step, the signing D-SVM 401 can also attach the current PCR values 321, and have the security coprocessor 309 sign all transmissions, providing additional proof that the data 405 originates from an authorized source.

Other uses of the sealed authentication token 303 are also possible. For example, in one embodiment, an encrypting D-SVM (not illustrated) can use the authentication token 303 as an encryption key. In other embodiments, one or more D-SVMs 301 on the client 103 can be used to generate and/or verify data 403 being sent from the client 103 to the server 105. As with the PIM 313 and the signing D-SVM 401 described above, these D-SVM(s) 301 can include PCR values 321 and/or a nonce 311, and direct the security coprocessor 309 sign the data 405, thereby providing proof to the server 105 that the 405 data was generated on and/or verified by the authorized client 103.

Note that the above described registration and sealing functionality protects the authentication token 303 from malicious code not only while in-transit, but also once the authentication token 303 is on the client 103. Although SSL or another encryption protocol could be used instead for the initial request 323 for and transmission of the authentication token 303, SSL and similar methods would only protect the authentication token 303 from observation while in transmit across on the network 107. Without the above described sealing functionality, the authentication token 303 would still be accessible to malicious code when stored on the client 103. The above described functionality, on the other hand, ensures that only authorized D-SVMs 301 can access the authentication token 303, because the authentication token 303 is sealed to those authorized D-SVMs 301. The hardware thus ensure that only authorized D-SVMs 301 can unseal and access the authentication token 303.

Figure 5:
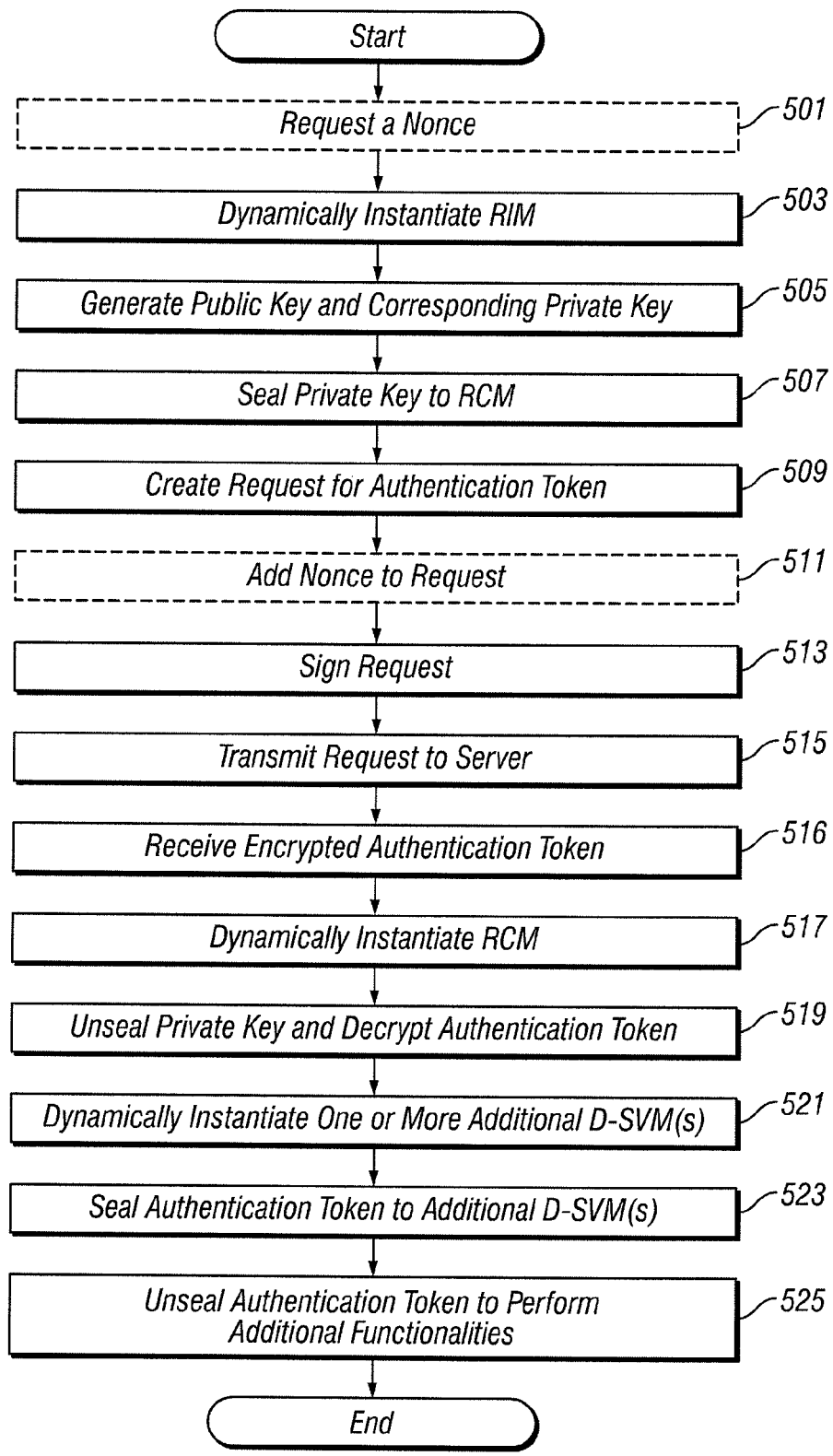
FIG. 5 is a flowchart illustrating client side steps for securely managing an authentication token, according to some embodiments.

FIG. 5 illustrates client 103 (FIG. 1) side steps for securely managing an authentication token, according to some embodiments. As illustrated in FIG. 5, in some embodiments, the authentication token management system 101 (FIG. 1) optionally requests 501 a nonce 311 (FIG. 3) from the server 105 (FIG. 1), to be included in a request 323 (FIG. 3) for an authentication token 303 (FIG. 3) as discussed below. The authentication token management system 101 (FIG. 1) uses hardware based security extensions on the client 103 (FIG. 1) to dynamically instantiate 503 the RIM 313 (FIG. 3). The hardware based security extensions used in this context can comprise, for example, a security extended CPU 307 (FIG. 3) and/or a security coprocessor 309 (FIG. 3). The authentication token management system 101 (FIG. 1) generates 505 a public key 317 (FIG. 3) and a corresponding private key 319 (FIG. 3). The RIM 313 (FIG. 3) then uses the hardware-based security extensions to seal 507 the private key 319 (FIG. 3) to the RCM 315 (FIG. 3). The authentication token management system 101 (FIG. 1) creates 509 the request 323 (FIG. 3) for the authentication token 303 (FIG. 3). This request 323 (FIG. 3) comprises at least the public key 317 (FIG. 3), and can further comprise at least one value 321 (FIG. 3) from a register of the security coprocessor 309 (FIG. 3). In embodiments in which the authentication token management system 101 (FIG. 1) has requested a nonce 311, the authentication token management system 101 (FIG. 1) adds 511 the nonce 311 (FIG. 3) to the request 323 (FIG. 3) as well.

The RIM 313 (FIG. 3) then uses the hardware based security extensions to sign 513 the request 323 (FIG. 3) for an authentication token 303 (FIG. 3). The authentication token management system 101 (FIG. 1) transmits 515 the signed request 323 (FIG. 3) to the server 105 (FIG. 1), and in response receives 516 from the server 105 (FIG. 1) an authentication token 303 (FIG. 3) encrypted with the public key 317 (FIG. 3). The authentication token management system 101 (FIG. 1) uses hardware based security extensions on the client 103 (FIG. 1) to dynamically instantiate 517 the RCM 315 (FIG. 3). The RCM 315 (FIG. 3) uses 519 the hardware based security extensions to unseal the private key 319 (FIG. 3), and uses the unsealed private key 319 (FIG. 3) to decrypt the received encrypted authentication token 303 (FIG. 3). The RCM 315 (FIG. 3) then uses hardware based security extensions to dynamically instantiate 521 at least one additional dynamic secure virtual machine 301 (FIG. 3), and to seal 523 the authentication token 303 (FIG. 3) thereto. This additional dynamic secure virtual machine 301 (FIG. 3) can subsequently unseal 525 the authentication token 303 (FIG. 3), and use the unsealed authentication token 303 (FIG. 3) to perform additional functionalities, such as signing, encrypting, generating or verifying data to be transmitted to the server 105 (FIG. 1).

Figure 6:
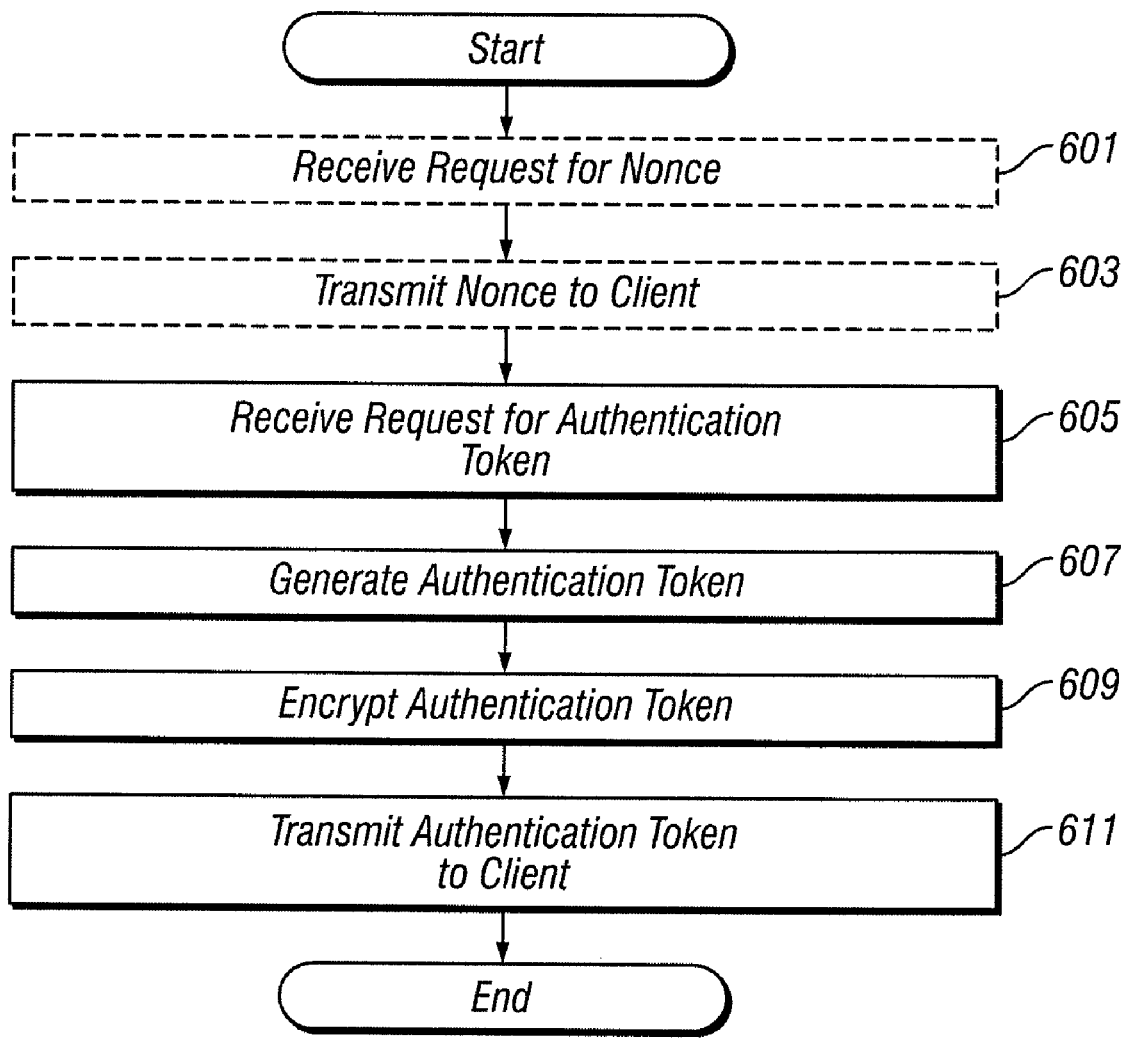
FIG. 6 is a flowchart illustrating server side steps for securely managing an authentication token, according to some embodiments.

FIG. 6 illustrates server 105 (FIG. 1) side steps for securely managing an authentication token 303 (FIG. 3), according to some embodiments. As illustrated in FIG. 6, in some embodiments, the server 105 (FIG. 1) receives 601 a request for a nonce 311 (FIG. 3) from the client 103 (FIG. 1). In such cases, the server 105 (FIG. 1) transmits 603 a nonce 311 (FIG. 3) to the client 103 (FIG. 1). The server 105 (FIG. 1) receives 605 a signed request 323 (FIG. 3) for an authentication token 303 (FIG. 3) from the client 103 (FIG. 1). The signed request 323 (FIG. 3) comprises at least the public key 317 (FIG. 3), and can also comprise the nonce 311 (FIG. 3) and/or at least one value 321 (FIG. 3) from a register of a security coprocessor 309 (FIG. 3) on the client 103 (FIG. 1). The server 105 (FIG. 1) verifies 605 that the signed request 323 (FIG. 3) for the authentication token 303 (FIG. 3) originates from an authorized client 103 (FIG. 1), based on the request being signed by authentic hardware-based security extensions on the client 103 (FIG. 1). Where the signed request 323 (FIG. 3) also comprises the nonce 311 (FIG. 3) and/or at least one value 321 (FIG. 3) from a register of a security coprocessor 309 (FIG. 3) on the client 103 (FIG. 1), these features are also used to verify 605 that the signed request 323 (FIG. 3) originates from an authorized client 103 (FIG. 1). The server 105 (FIG. 1) then generates 607 an authentication token 303 (FIG. 3) for the client 103 (FIG. 1), and uses the received public key 317 (FIG. 3) to encrypt 609 the generated authentication token 303 (FIG. 3). The server 105 (FIG. 1) then transmits 611 the encrypted authentication token 303 (FIG. 3) to the client 103 (FIG. 1).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for securely managing an authentication token, the method comprising the steps of:
    using hardware based security extensions, by a computer, to dynamically instantiate a first dynamic secure virtual machine and a second dynamic secure virtual machine in system memory of the computer;
    generating a public key and a corresponding private key, by the computer;
    using hardware-based security extensions, by the first dynamic secure virtual machine in the system memory of the computer, to seal the private key to the second dynamic secure virtual machine at a hardware level, wherein a security coprocessor only allows access to an address associated with a sealing process by the second dynamic secure virtual machine by setting at least one platform configuration register to a hash value of the second dynamic secure virtual machine;
    creating a request for an authentication token, by the computer, the created request comprising at least the public key;
    using hardware based security extensions to sign the created request, by the first dynamic secure virtual machine in the system memory of the computer;
    transmitting, by the computer, the signed request for an authentication token to a remote computer;
    responsive to transmitting the signed request for an authentication token to the remote computer, receiving, by the computer, an authentication token encrypted with the public key, from the remote computer;
    using hardware based security extensions to unseal the private key, by the second dynamic secure virtual machine in the system memory of the computer;
    using the unsealed private key to decrypt the received encrypted authentication token, by the second dynamic secure virtual machine in the system memory of the computer; and
    using hardware based security extensions to seal the authentication token to at least one additional dynamic secure virtual machine, by the second dynamic secure virtual machine in the system memory of the computer.

2. The method of claim 1 wherein creating the request for an authentication token, by the computer, further comprises:
    creating the request for an authentication token, by the computer, the created request comprising at least the public key and at least one value from a register of the security coprocessor on the computer.

3. The method of claim 1 wherein creating the request for an authentication token, by the computer, further comprises:
    requesting, by the computer, a nonce from the remote computer; and
    creating the request for the authentication token, by the computer, the created request comprising at least the public key and the nonce.

4. The method of claim 1 wherein using hardware based security extensions to seal the authentication token to at least one additional dynamic secure virtual machine, by the second dynamic secure virtual machine in the system memory of the computer, further comprises:
    using hardware based security extensions, by the second dynamic secure virtual machine in the system memory of the computer, to dynamically instantiate a third dynamic secure virtual machine in the system memory of the computer; and
    using hardware based security extensions to seal the authentication token to the third dynamic secure virtual machine in the system memory of the computer, by the second dynamic secure virtual machine in the system memory of the computer.

5. The method of claim 4 further comprising:
    using hardware based security extensions to unseal the authentication token, by the third dynamic secure virtual machine in the system memory of the computer; and
    using the unsealed authentication token, by the third dynamic secure virtual machine in the system memory of the computer, to generate a signature with which to sign data to be transmitted to at least one remote computer.

6. The method of claim 4 further comprising:
    using hardware based security extensions to unseal the authentication token, by the third dynamic secure virtual machine in the system memory of the computer; and
    using the unsealed authentication token, by the third dynamic secure virtual machine in the system memory of the computer, to encrypt data to be transmitted to at least one remote computer.

7. The method of claim 4 further comprising:
    using hardware based security extensions to unseal the authentication token, by the third dynamic secure virtual machine in the system memory of the computer; and
    using the unsealed authentication token, by the third dynamic secure virtual machine in the system memory of the computer, to generate data to be transmitted to at least one remote computer.

8. The method of claim 4 further comprising:
    using hardware based security extensions to unseal the authentication token, by the third dynamic secure virtual machine in the system memory of the computer; and
    using the unsealed authentication token, by the third dynamic secure virtual machine in the system memory of the computer, to verify data to be transmitted to at least one remote computer.

9. At least one non-transitory computer readable storage medium for securely managing an authentication token, the non-transitory computer readable storage medium comprising:

program code for using hardware based security extensions to dynamically instantiate a first dynamic secure virtual machine and a second dynamic secure virtual machine in system memory of the computer;

program code for generating a public key and a corresponding private key;

program code for using hardware-based security extensions, by the first dynamic secure virtual machine in the system memory of the computer, to seal the private key to the second dynamic secure virtual machine at a hardware level, wherein a security coprocessor only allows access to an address associated with a sealing process by the second dynamic secure virtual machine by setting at least one platform configuration register to a hash value of the second dynamic secure virtual machine;

program code for creating a request for an authentication token the created request comprising at least the public key;

program code for using hardware based security extensions to sign the created request, by the first dynamic secure virtual machine in the system memory of the computer;

program code for transmitting the signed request for an authentication token to a remote computer;

program code for, responsive to transmitting the signed request for an authentication token to the remote computer, receiving an authentication token encrypted with the public key, from the remote computer;

program code for using hardware based security extensions to unseal the private key, by the second dynamic secure virtual machine in the system memory of the computer;

program code for using the unsealed private key to decrypt the received encrypted authentication token, by the second dynamic secure virtual machine in the system memory of the computer; and program code for using hardware based security extensions to seal the authentication token to at least one additional dynamic secure virtual machine, by the second dynamic secure virtual machine in the system memory of the computer.

10. The non-transitory computer readable storage medium of claim 9 wherein the program code for creating the request for an authentication token further comprises:

program code for creating the request for an authentication token the created request comprising at least the public key and at least one value from a register of the security coprocessor on the computer.

11. The non-transitory computer readable storage medium of claim 9 wherein the program code for creating the request for an authentication token further comprises program code for:

requesting, by the computer, a nonce from the remote computer; and creating the request for the authentication token, by the computer, the created request comprising at least the public key and the nonce.

12. The non-transitory computer readable storage medium of claim 9 wherein the program code for using hardware based security extensions to seal the authentication token to at least one additional dynamic secure virtual machine, by the second dynamic secure virtual machine in the system memory of the computer, further comprises program code for:

using hardware based security extensions, by the second dynamic secure virtual machine in the system memory of the computer, to dynamically instantiate a third dynamic secure virtual machine in the system memory of the computer; and using hardware based security extensions to seal the authentication token to the third dynamic secure virtual machine in the system memory of the computer, by the second dynamic secure virtual machine in the system memory of the computer.

13. The non-transitory computer readable storage medium of claim 12 further comprising:

program code for using hardware based security extensions to unseal the authentication token, by the third dynamic secure virtual machine in the system memory of the computer; and program code for using the unsealed authentication token, by the third dynamic secure virtual machine in the system memory of the computer, to generate a signature with which to sign data to be transmitted to at least one remote computer.

14. The non-transitory computer readable storage medium of claim 12 further comprising:

program code for using hardware based security extensions to unseal the authentication token, by the third dynamic secure virtual machine in the system memory of the computer; and program code for using the unsealed authentication token, by the third dynamic secure virtual machine in the system memory of the computer, to encrypt data to be transmitted to at least one remote computer.

15. The non-transitory computer readable storage medium of claim 12 further comprising:

program code for using hardware based security extensions to unseal the authentication token, by the third dynamic secure virtual machine in the system memory of the computer; and program code for using the unsealed authentication token, by the third dynamic secure virtual machine in the system memory of the computer, to generate data to be transmitted to at least one remote computer.

16. The non-transitory computer readable storage medium of claim 12 further comprising:

program code for using hardware based security extensions to unseal the authentication token, by the third dynamic secure virtual machine in the system memory of the computer; and program code for using the unsealed authentication token, by the third dynamic secure virtual machine in the system memory of the computer, to verify data to be transmitted to at least one remote computer.

* * * * *